United States Patent Office 2,770,638
Patented Nov. 13, 1956

2,770,638

XANTHYL AND TRITHIOCARBONYL SULFONES AS NOVEL COMPOSITIONS OF MATTER

Silvio L. Giolito, New York, N. Y., and Robert H. Jones, Atlanta, Ga., assignors to Stauffer Chemical Company, a corporation of California No Drawing. Application July 3, 1953,
Serial No. 366,055

6 Claims. (Cl. 260—455)

This invention relates to certain novel sulfones as compositions of matter.

The sulfones of the present invention are embraced by the following general structural formula:

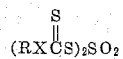

In this formula, X may be oxygen or sulfur, and R is an aliphatic organic radical, either saturated or unsaturated, having from one to twelve carbon atoms. Preferably, R is a short chain saturated aliphatic radical of from one to four carbon atoms. In the formula, if X is oxygen, the compound is a xanthyl compound, while if X is sulfur, the compound is a trithiocarbonyl compound.

In general, the sulfones of the present invention may be prepared by reacting a slurry of a metallic salt of an alkyl trithiocarbonate or an alkyl xanthate with sulfuryl chloride ($SO_2Cl_2$), to produce the sulfone. The reaction may be conducted in an inert solvent such as ether, dioxane or carbon tetrachloride. The reaction goes readily at room temperatures and it is preferred to operate below about 30° C. Reaction temperatures as low as 0° C. may be used. Although it is preferred to employ stoichiometric quantities of the reactants, considerable departures from this ratio can be made.

After the reaction has taken place, the mixture is washed well with an aqueous solution of a mildly alkaline material such as sodium carbonate or sodium sulfide dissolved in water, followed by an additional washing with plain water. The solution is then dried over an inert drying agent such as sodium sulfate and the solvent is removed by evaporation under reduced pressure at a temperature which is preferably under 30° C. The compounds of the present invention are not heat stable at temperatures above about 30° C. and therefore cannot be isolated by normal distillation procedures. However, reasonably pure materials may be prepared if purified starting materials are employed and the temperature of the reaction is kept within the limits specified above.

The metallic trithiocarbonates and xanthates are first prepared by the reaction of carbon disulfide with the metallic mercaptide or alcoholate of the corresponding compound containing the radical R. For instance, if one wished to prepare methyl xanthate, one would start with an alkali metal methyl mercaptide such as sodium methyl mercaptide or an alkali metal alcoholate such as potassium methylate. The intermediate salt may be isolated and purified by conventional methods, or it may be used directly in the reaction with sulfuryl chloride.

The following non-limiting examples typify the preparation of the sulfones of the present invention. It will be noted that after each compound name a code number has been inserted. The compound will sometimes be referred to by the code number in the balance of the specification.

*Example I.*—Lauryl xanthyl sulfone (591). A charge of 268 gms. (0.95 mole) sodium lauryl xanthate was slurried with 500 ml. carbon tetrachloride followed by the slow dropwise addition of 64 gms. (0.95 mole) of sulfuryl chloride with agitation and cooling at a charge temperature of 15° C. The charge was filtered and the filtrate was treated with a dilute sodium carbonate solution. The organic layer was separated and dried over sodium sulfate. The organic solvent was removed at reduced pressure, maintaining the temperature below 30° C. The yield was 165 grams of a light brown oil.

*Example II.*—Methyl xanthyl sulfone (572) was produced in the same manner as Example I, except that sodium methyl xanthate was used in place of sodium lauryl xanthate. The product was a clear yellow oil with a 37% yield. Percent S found: 58.1%; calculated 57.6%.

*Example III.*—Butyl xanthyl sulfone (577) was produced in the same manner as Example I, except that sodium butyl xanthate was used in place of sodium lauryl xanthate. The product was a clear yellow oil with a 53.8% yield. Percent S found: 42.7%; calculated 44.3%.

*Example IV.*—Allyl xanthyl sulfone (661) was produced in the same manner as Example I except that sodium allyl xanthate was used in place of sodium lauryl xanthate. The product was a light yellow oil with a 36.1% yield.

*Example V.*—Ethyl xanthyl sulfone was made in the same manner as Example I except that sodium ethyl xanthate was used as the starting material.

*Example VI.*—Methyl trithiocarbonyl sulfone (607). A charge of 96 gms. (2.0 moles) methyl mercaptan was added to a slurry of 132 gms. (2.0 moles) powdered potassium hydroxide in one litre dioxane followed by the addition of 167 gms. (2.2 moles) carbon disulfide at 20–30° C. The charge was agitated for 30 minutes, followed by the addition of 135 gms. (1.0 mole) sulfuryl chloride. The product was worked up as in Example I and yielded 22 gms. of a yellow product melting at 91–92° C. Percent S found: 77.3%; calculated 77.2%.

*Example VII.*—Tertiary butyl trithiocarbonyl sulfone (595) was produced in the same manner as Example VI except that tertiary butyl mercaptan was used instead of methyl mercaptan. The product was a deep red oil with a 33.3% yield. Percent S found: 50.4%; calculated 56.7%.

*Example VIII.*—Lauryl trithiocarbonyl sulfone is made in the same manner as Example VI except that lauryl mercaptan is used as a starting material rather than methyl mercaptan.

The compounds of the present invention have many uses. They may be used as intermediates in the preparation of further compounds and are excellent for use as fungicides, insecticides, nematocides and acaricides. Typical of the uses of the compounds in their use as fungicides, as the following experiment shows:

AGAR PLATE TEST

In testing compounds for fungitoxicity in this method, the compound is dispersed evenly through 20 ml. of warm potato dextrose agar in a petri dish. A series of plates containing various concentrations of the compound are prepared for each fungus species used. When the agar has cooled and solidified the center of each plate is seeded with a few spores of the desired fungus. After seven days' incubation in the dark under controlled temperatures, the diameter of the fungus colony on each plate is measured and the relationship between the growth on each plate and that of an untreated but seeded control plate is recorded as percent control (or percent inhibition of growth). When applied to the compounds of the present invention, the following data were obtained:

XANTHYL SULFONES

| Compound | p. p. m. S. fructicola | | | |
|---|---|---|---|---|
| | 500 | 100 | 50 | 25 |
| 572 | 100 | 100 | 100 | 100 |
| 577 | 20 | 7 | | |
| 591 | 69 | 22 | 22 | |
| 661 | 100 | 100 | 100 | 93 |

TRITHIOCARBONYL SULFONES

| 595 | 49 | 47 | 29 | 15 |
|---|---|---|---|---|
| 607 | 100 | 100 | 40 | 16 |

We claim:
1. As a new composition of matter, a compound having the formula:

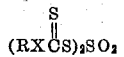

$(RXCS)_2SO_2$ wherein X is chosen from the group consisting of sulfur and oxygen, and R is an alkyl radical having from one to twelve carbon atoms.

2. As a new composition of matter methyl xanthyl sulfone.

3. As a new composition of matter butyl xanthyl sulfone.

4. As a new composition of matter lauryl xanthyl sulfone.

5. A a new composition of matter tertiary butyl trithiocarbonyl sulfone.

6. As a new composition of matter methyl trithiocarbonyl sulfone.

References Cited in the file of this patent

UNITED STATES PATENTS 2,140,608   Ufer _____ Dec. 20, 1938

OTHER REFERENCES

Richter, Berichte 49, 1026–9 (1916). (Copy available in Div. 6.)